UNITED STATES PATENT OFFICE 2,566,802

ALUMINUM ARTICLES COATED WITH HEAT-SEALABLE COMPOSITION

Reginald G. Kennelly, Longmeadow, Mass., assignor to Monsanto Chemical Company, St. Louis, Mo., a corporation of Delaware No Drawing. Application September 10, 1948,
Serial No. 48,761

5 Claims. (Cl. 117—122)

This invention relates to the preparation of coated articles. More particularly, this invention relates to the preparation of coated aluminum articles.

With the increased availability of aluminum, the possibility of using this metal for various purposes has been the subject of wide investigation. Certain of the possible uses involve coating the aluminum with an adherent film. For example, the use of aluminum foil for packaging purposes frequently necessitates applying to the foil a heat-sealable coating which is "non-blocking" under ordinary conditions, but at the same time, is highly adherent to the foil. Such coatings fulfill the function of enabling a package comprising the foil to be effectively sealed by hot pressing together two foil surfaces having an intermediate layer of the adhesive coating.

It is an object of this invention to provide coated aluminum articles. It is a particular object of this invention to provide aluminum articles with highly adhesive coatings of polyvinyl butyral-nitrocellulose compositions.

These and other objects are attained according to this invention by coating aluminum with a polyvinyl butyral-nitrocellulose composition with which is incorporated a phenol-formaldehyde resin.

The following examples are illustrative of the present invention, but are not to be construed as limitative thereof. Where parts are mentioned, they are parts by weight.

The method followed in the examples is to allow the nitrocellulose to soak in the ethanol until it is well softened and then add the ethyl acetate, followed by stirring and heating until the nitrocellulose is completely dissolved. The plasticizer and phenolic resin are then added to the nitrocellulose solution and while rapidly agitating the resulting product, the polyvinyl butyral in finely divided form is quickly added. Stirring is continued until the viscosity is too high to permit easy stirring and then the viscous solution is allowed to stand at 50–60° C. to complete the solution of any undissolved polyvinyl butyral and to allow air bubbles to escape.

In applying the solution to aluminum foil, the foil is placed on a smooth rigid surface such as a sheet of plate glass moistened with water, toluene, alcohol or other liquid. The foil (0.001 inch thick) is smoothed out on the moistened glass and the coating solution is applied to the foil by means of a doctor blade to achieve an even coating. In the examples, the doctor blade is adjusted to give a coating thickness of 0.0015–0.002 inch after drying.

The coated foil is allowed to air dry for a short period of time until the coated surface is tack-free and then the coated foil is placed in a drier at 80° C. to remove the remaining solvent.

Prior to testing, the coated foil is conditioned by standing for at least 16 hours at 25° C. and 50% relative humidity.

For the purpose of evaluating the adhesion of the coatings of the invention, conditioned samples are cut into strips one inch wide and about six inches long. By moistening one end of these strips with ethyl acetate, the coating may be loosened and the stripping initiated. After severing the portion of the strip which is moistened with ethyl acetate, the specimen is clamped in a Scott-L5 rubber tensile testing apparatus, in which a 15-pound spring scale has been substituted for the dial recording mechanism normally installed on this tester. The portion of the foil from which the plastic coating is stripped as indicated above, is placed in the clamp which is attached to the 15-pound spring scale. The free plastic end is placed in the clamp on the movable carriage. The coated end of the specimen strip is held at right angles to the free foil and free plastic ends. In conducting the test, the foil is separated from the plastic at a constant rate.

The phenolic resin used in Examples I–V, inclusive, is a thermosetting phenol-formaldehyde resin.

The polyvinyl butyral used in the examples is made up on a weight basis of about 17–21% hydroxyl groups calculated as polyvinyl alcohol, less than 3% acetate groups calculated as polyvinyl acetate and the balance substantially polyvinyl butyraldehyde acetal. It is made from a polyvinyl acetate of such a viscosity that a 7.5% solution by weight of the polyvinyl butyral in methanol has a viscosity of 160 centipoises at 20° C. Polyvinyl butyrals having other viscosities may be used, e. g., 25–300 centipoises under the same conditions.

The nitrocellulose used in the examples is of the so-called ½-second viscosity grade and contains approximately 11% nitrogen.

Example I

| | Parts |
|---|---|
| Polyvinyl butyral | 100 |
| Nitrocellulose | 25 |
| Butyl ricinoleate | 25 |
| Phenol-formaldehyde resin | 5 |
| Ethyl acetate | 50 |
| Ethanol | 400 |

The resulting composition, when applied to aluminum and freed from solvent in the manner set forth above, is found to have adhesion to aluminum which is 19% greater than that obtained with an otherwise identical composition which does not contain the phenolic resin. Increasing the amount of the phenolic resin over that used in Example I is found to increase the adhesion markedly as indicated below by the adhesion increase as the amount of phenolic resin is increased.

| Phenolic Resin | Increase in Adhesion |
|---|---|
| Parts | Per cent |
| 10 | 121 |
| 15 | 193 |
| 20 | 314 |
| 25 | 322 |
| 30 | 314 |

It is further discovered that a similar increase in adhesion is effected even though somewhat different ratios of acetal resin, nitrocellulose and plasticizer are used. Thus, the addition of the phenol-formaldehyde resin used in Example I to otherwise identical compositions in which the nitrocellulose is raised to 30 or 35 parts and the butyl ricinoleate is kept the same or raised to 30 parts, causes an increase in adhesion to aluminum comparable to that set forth in Example I.

Example II

| | Parts |
|---|---|
| Polyvinyl butyral | 100 |
| Nitrocellulose | 25 |
| Butyl ricinoleate | 20 |
| Phenol-formaldehyde resin | 5 |
| Ethyl acetate | 50 |
| Ethanol | 400 |

The adhesion of this composition to aluminum foil on application to the foil in the manner set forth above is found to be excellent and a great improvement over an otherwise identical composition which does not contain the phenol-formaldehyde resin.

Increasing the content of the phenol-formaldehyde resin to 10, 15, 20, 25 and 30 parts, respectively, also results in compositions which have excellent adhesion to aluminum.

Example III

Example I is repeated except that the nitrocellulose content is reduced to 15 parts and the phenol-formaldehyde resin content is increased to 15 parts. The resulting composition is found to have good adhesion to aluminum and to be markedly superior to an otherwise identical composition which does not contain the phenol-formaldehyde resin.

Example IV

Example I is repeated except that the nitrocellulose content is increased to 30 parts, the butyl ricinoleate is reduced to 20 parts and the phenol-formaldehyde resin content is increased to 15 parts. The resulting composition is found to have very good adhesion to aluminum and to be somewhat superior to the composition of Example III in this respect.

Example V

Example I is repeated except that the nitrocellulose content is increased to 37.5 parts, the butyl ricinoleate content is increased to 50 parts and the phenol-formaldehyde resin content is increased to 15 parts. The resulting composition is found to have an adhesion to aluminum which is superior to that of a similar composition which does not contain the phenol-formaldehyde resin.

In the following example, the phenol-formaldehyde resin is of the so-called Novolak type, i. e., phenol is reacted with a molar deficiency of formaldehyde under acid conditions.

Example VI

| | Parts |
|---|---|
| Polyvinyl butyral | 100 |
| Nitrocellulose | 25 |
| Butyl ricinoleate | 25 |
| Phenol-formaldehyde resin | 5 |
| Ethyl acetate | 50 |
| Ethanol | 400 |

When applied to aluminum in the manner set forth hereinbefore, this composition is found to have an adhesion thereto which is about 37% greater than that of an otherwise identical composition which does not contain the phenolic resin. Similar results are obtained when the phenolic resin content is raised to 10 parts. Raising the phenolic resin content to 15 parts results in an increase in adhesion of about 100% as compared with a similar composition which does not contain the phenolic resin.

Even better results are obtained when the nitrocellulose content is raised to 30 parts and the phenolic resin content is either 15 parts or 20 parts. Such compositions exhibit an increased adhesion of about 125%. Similar results are obtained when the nitrocellulose content is 35 parts and the butyl ricinoleate content is 30 parts.

In the following example, the phenolic resin is made by reacting resorcinol with a molar deficiency of formaldehyde under acid conditions.

Example VII

| | Parts |
|---|---|
| Polyvinyl butyral | 100 |
| Nitrocellulose | 25 |
| Butyl ricinoleate | 25 |
| Phenolic resin | 5 |
| Ethyl acetate | 50 |
| Ethanol | 400 |

This composition exhibits an adhesion to aluminum which is 65% greater than that of the same composition from which the phenolic resin is eliminated. Raising the phenolic resin content to 10 parts results in an 81% increase in adhesion and raising the phenolic resin content to 15 parts causes an increase in adhesion of 108%.

As indicated hereinbefore, numerous variations may be introduced into the compositions of the invention and the methods of applying the coating compositions without departing from the spirit of the invention. Thus, nitrocellulose having various viscosity characteristics may be used, for example, from ¼-second to 100-second nitrocellulose. The nitrocellulose used may be that customarily employed in either the plastics or coating industries. These nitrocellulose products usually have a nitrogen content of about 10.5–12.5%. Low viscosity nitrocellulose, e. g. ½-second, is preferred when the acetal resin has a viscosity (as defined above) of 100 centipoises or above. The viscosity values given herein for nitrocellulose are determined by A. S. T. M. method D301–33.

The polyvinyl butyral employed may be varied substantially as regards its physical and chemical characteristics. Thus, the polyvinyl butyral may be made from polyvinyl acetate having varying viscosities, e. g., 1-molar benzene solutions thereof may have viscosities of 5–500 centipoises at 20° C. with the result that solutions of the polyvinyl butyral vary substantially in viscosity. The hydroxyl group and ester content of the polyvinyl butyral is also subject to considerable variation. Usually, it is found that the polyvinyl butyral should contain at least 5% hydroxyl groups by weight calculated as polyvinyl alcohol and generally not more than 30%. A preferred range is 10–25% hydroxyl groups calculated as polyvinyl alcohol. The acetate or other ester group content of the polyvinyl acetal may also vary substantially. Thus, the ester group content may be entirely eliminated, or there may be as much as 30–35% ester groups by weight calculated as polyvinyl ester.

The relative proportions of acetal resin, nitrocellulose plasticizer and phenol-formaldehyde resin may be substantially varied as indicated by the variations which appear in the examples. Usually, it is found that at least 5 parts of a plasticizer such as butyl ricinoleate for every 100 parts of acetal resin are desirable, but for most applications, not more than 50 parts are generally used. In place of butyl ricinoleate, other plasticizers may be used, such as tricresyl phosphate, dioctyl phthalate, triethylene glycol dihexoate, dibutoxy ethyl phthalate, glyceryl monooleate, etc. Also, mixtures of these and other plasticizers may be used, if desired. A preferred range of plasticizers is 20–40 parts for every 100 parts of polyvinyl butyral.

As regards the nitrocellulose content, the use of less than 15 parts for every 100 parts of acetal resin is to be avoided, in general, but satisfactory compositions may be made which contain as much as 60 parts, particularly when a relatively high plasticizer content is used. Thus, as regards the relative proportions of nitrocellulose and plasticizer, the amount of neither of these components should exceed the amount of the other by more than 50% for best results. A preferred range of proportions of nitrocellulose is 20–50 parts for every 100 parts of polyvinyl butyral.

The amount of the phenol-formaldehyde resin which is incorporated in the compositions of the invention may be substantially varied and still result in a significant increase in adhesion to aluminum. Generally, at least 2 parts by weight of a phenol-formaldehyde resin is incorporated for every 100 parts of polyvinyl butyral. In many cases, as the amount of the phenol resin is increased, the adhesion shows a progressive increase. However, in order to prevent deleterious effects from the use of large amounts of phenolic resins, not over 40 parts are usually employed and a preferred range of proportions is 5–30 parts for every 100 parts of polyvinyl butyral.

The phenol-formaldehyde resins may be either the non-reactive or Novolak type or the potentially reactive or resole type. They may be prepared in the presence of either an acid or basic catalyst in accordance with procedures well known to those skilled in the art.

According to one embodiment of the invention, the resins are of the non-reactive or Novolak type, i. e., phenols reacted with a molar deficiency of formaldehyde under acid conditions. Compositions of the invention which include these phenolic resins are characterized by extreme resistance to loss of heat sealing properties on standing or heating coupled with outstanding adhesion to aluminum.

Various phenols may be used in preparing the phenol-formaldehyde resins. Examples include such monohydric phenols as phenol and ortho-, meta-, and para-cresol, the various xylenols, mesitol, durenol, thymol, and various other substituted monohydric phenols, such as paraphenyl phenol, parapropyl phenol, parabutyl phenol, paraamyl phenol and the like, polyhydric phenols may also be used, such as resorcinol, catechol, quinol, orcinol, dihydroxy xylols, pyrogalol, phloro-glucinol, etc., diphenylol methane, diphenylol ethane, diphenylol propane, diphenylol butane, diphenylol hexane and dicresylol propane.

While the invention has been illustrated with respect to alumimum foil having a thickness of 0.001 inch, it is obvious that aluminum articles having other thicknesses and/or other shapes may be coated in accordance with the invention to provide adherent coatings therefor having heat-sealable properties.

The thickness of the coating which is applied to the aluminum foil or other aluminum article may also be varied to meet particular requirements. However, for most requirements, a thickness of 0.0005–0.005 inch is sufficient.

In place of the mixture of ethanol and ethyl acetate, used in the examples, other solvents for the components of the coating composition may be used. For example, the ratio of ethanol to ethyl acetate may be raised as high as 99:1, or ethanol alone may be used. Also, along with the ethanol and ethyl acetate, such solvents may be incorporated as isopropanol, amyl alcohol, butanol, hexanol, octanol, toluene, etc. Other suitable solvents will be apparent to those skilled in the art.

In addition to the exceptional adhesion to aluminum of the coatings of the invention, they are characterized by the ability to heat seal in a short time (3–10 seconds) under moderate pressures (1–3 pounds per square inch) and elevated temperatures, e. g. 175° C. Furthermore, these coatings are "non-blocking" at ordinary temperatures (or even at moderately raised temperatures) i. e., they do not prematurely adhere, for example, when articles coated therewith are in storage.

Another valuable property of the coating compositions is their excellent strength characteristics as reflected in the high tensile strength of free films thereof and their high heat seal strength.

While the invention has been illustrated by examples showing incorporation of the individual components of the compositions in the solvent, other procedures may be used for combining the several ingredients. For example, the butyl ricinoleate may be admixed with the polyvinyl butyral and the resulting plasticized polyvinyl butyral and the phenolic resin then admixed with the nitrocellulose solution. It is preferred to dissolve the nitrocellulose in the solvent or one or more components thereof, rather than attempt to dissolve the nitrocellulose in a solution of the polyvinyl butyral. A further alternative is to dissolve separately the nitrocellulose and the polyvinyl butyral and then combine the solutions. The butyl ricinoleate and the phenolic resin may be incorporated in either solution, or partly in both.

Instead of applying the compositions on the aluminum from solution, they may be applied in the absence of solvent by the application of heat, with or without pressure. Of course, in the preparation of the compositions, a certain amount of solvent is desirable for purposes of safety while incorporating the nitrocellulose. This solvent may be eliminated before or after the application to the aluminum. Aluminum articles coated with polyvinyl butyral-nitrocellulose compositions containing glyceryl monooleate and butyl ricinoleate are described and claimed in co-pending applications Ser. No. 48,754 and Ser. No. 48,753, respectively, filed September 10, 1948, in the name of George H. Bischoff.

It is obvious that many variations may be made in the products and processes of this invention without departing from the spirit and scope thereof as defined in the appended claims.

What is claimed is:

1. An aluminum article having a highly adhesive heat-sealable coating thereon comprising, on a weight basis, 100 parts of polyvinylbutyral, 15–60 parts of nitrocellulose, 5–50 parts of a plasticizer taken from the group consisting of butyl ricinoleate, tricresyl phosphate, dioctyl phthalate, triethylene glycol dihexoate, dibutoxyethyl phthalate, and glyceryl mono-oleate and 2–40 parts of a phenol-formaldehyde resin.

2. A product as defined in claim 1 in which the aluminum article is an aluminum foil.

3. A product as defined in claim 2 in which the phenol-formaldehyde resin is made from hydroxy benzene and formaldehyde.

4. A product as defined in claim 3 in which the phenolic resin is a Novolak type resin.

5. A product as defined in claim 2 in which the phenol-formaldehyde resin is a thermosetting resin.

REGINALD G. KENNELLY.

REFERENCES CITED

The following references are of record in the file of this patent:

UNITED STATES PATENTS

| Number | Name | Date |
|---|---|---|
| 2,147,772 | Kallander | Feb. 21, 1939 |
| 2,307,588 | Jackson | Jan. 5, 1943 |
| 2,433,097 | Debacher | Dec. 23, 1947 |
| 2,442,936 | Rohdin | June 8, 1948 |